Patented Feb. 23, 1943

2,312,210

UNITED STATES PATENT OFFICE 2,312,210

STABLE FORMALDEHYDE-UREA COMPOSITION CONTAINING A HARDENING AGENT

William C. Dearing, Toledo, Ohio

No Drawing. Application July 18, 1940,
Serial No. 346,177

5 Claims. (Cl. 260—69)

The invention relates to a stable dry mixture of a hardenable water-soluble formaldehyde-urea reaction product with a hardening agent therefor, which can be used for an adhesive or coating composition upon addition of water.

An aqueous solution of a formaldehyde-urea reaction product is valuable as an adhesive or a coating composition, because the reaction product in such a solution can be caused to become insoluble after the solution has been applied, to produce a water-resistant adhesive bond or surface coating. A formaldehyde-urea reaction product in aqueous solution is superior to other resinformers in the ease and rapidity with which it can be converted into the insoluble state after being applied. Plywood that has been glued with an aqueous solution of a formaldehyde-urea reaction product, unlike plywood that has been glued with other thermosetting adhesives, does not need to be subjected to an elevated temperature in a heated press in order to convert the formaldehyde-urea reaction product into the insoluble resin. Expensive hot-pressing equipment is not necessary when an aqueous solution of a formaldehyde-urea reaction product is used as an adhesive, because such an adhesive, after being applied, can be converted at ordinary temperatures into an insoluble resinous bond by the action of a hardening agent that renders the composition acid and thus causes the formaldehyde-urea reaction product to harden or become insoluble. The hardening agents heretofore used in ordinary commercial practice are ammonium chloride and ammonium thiocyanate, which are not strongly acid in themselves, but which react with the free formaldehyde that is present in an aqueous solution of a formaldehyde-urea reaction product to form strongly acid hexamethylenetetramine salts.

However, when an aqueous solution of a formaldehyde-urea reaction product is used as an adhesive or a coating composition, the acid hardening agent cannot be added until just before the composition is applied, because the gelling or conversion of the formaldehyde-urea reaction product into an insoluble resin begins as soon as the hardening agent is added. Therefore, it has been necessary to ship the formaldehyde-urea reaction product and the hardening agent in separate containers, and to rely upon the user to add the correct proportion of hardening agent just before the solution of the formaldehyde-urea reaction product is applied.

Water-soluble formaldehyde-urea reaction products for use as adhesives are sold commercially both in dry form and in the form of aqueous solutions. When a formaldehyde-urea reaction product that has been shipped in dry form is to be used as an adhesive, water is added by the user to obtain an aqueous solution of the desired dilution. Both in the case of a formaldehyde-urea adhesive that has been purchased in the form of a solution, and in the case of an adhesive solution that the user has prepared by adding water to a dry formaldehyde-urea reaction product, the hardening agent is not added to the formaldehyde-urea reaction product until just before the adhesive is to be applied.

The necessity for shipping the formaldehyde-urea reaction product and the hardening agent in separate containers has been a severe handicap in the development of the formaldehyde-urea adhesive industry. It has been impossible to furnish formaldehyde-urea adhesives for domestic use, because there are no facilities in the ordinary home for measuring out the exact amount of hardening agent required for use with a given quantity of a water-soluble formaldehyde-urea adhesive. Many small industrial establishments do not have sufficiently accurate weighing equipment for measuring out the proper amount of hardening agent for use with a formaldehyde-urea adhesive. Moreover, through carelessness or oversight, a workman sometimes forgets to add any hardening agent, or adds the hardening agent twice to the same batch. In either case, the entire batch of adhesive is spoiled.

Accurate measurement of the amount of hardening agent to be added to a given quantity of a water-soluble formaldehyde-urea adhesive is important. If too much hardening agent is added, the adhesive may gel or harden so rapidly that there is no time for applying it. If too little hardening agent is added, the adhesive will not harden properly, and will not produce a satisfactory bond.

An industrial user of a formaldehyde-urea adhesive ordinarily purchases a 100-pound container of the adhesive as a minimum quantity, even though it may take several days to use up 100 pounds of the adhesive. Although there may be supplied, along with the 100-pound container of the adhesive, a separate container holding the proper amount of hardening agent for use with 100 pounds of the adhesive, any of the adhesive to which hardening agent has been added must be used up immediately before it gels and becomes insoluble. Therefore, the user will remove a portion of the adhesive from the 100-pound container each day, and add a measured portion of the hardening agent.

If a dry mixture of ammonium chloride with a water-soluble formaldehyde-urea reaction product could be sold to a user of adhesives, the user would not be required to add the hardening agent, and there would be no more difficulties arising from incorrect measurement of the hardening agent by the user, or failure to add the hardening agent. However, it has been found that when dry ammonium chloride is mixed with a dry water-soluble formaldehyde-urea reaction product, the hardening agent causes rapid hardening of the reaction product, even in the dry state, and the mixture soon becomes insoluble and worthless.

The principal object of the invention is to provide a stable dry mixture of a hardenable water-soluble formaldehyde-urea reaction product with a hardening agent therefor, which is capable of forming a self-hardening adhesive or coating composition upon addition of water. More specific objects and advantages are apparent from the description, which merely discloses and illustrates the invention and is not intended to impose limitations upon the claims.

A stable dry mixture of an adhesive and a hardening agent therefor, embodying the invention, comprises a hardenable water-soluble formaldehyde-urea reaction product in admixture with an ammonium salt of a non-volatile acid strong enough so that its 1 per cent aqueous solution has a pH not greater than about 4. This mixture of a dry formaldehyde-urea reaction product and a dry hardener therefor is stable over long periods of time. Its stability is not appreciably different from the stability of a dry formaldehyde-urea reaction product alone containing no hardening agent. Upon addition of water to the mixture, however, a self-hardening adhesive solution is formed. The adhesive solution obtained by adding water to a stable dry mixture embodying the invention can be made to harden with any desired rapidity by using a proper amount of the hardening agent in the dry mixture.

A stable dry mixture embodying the invention is suitable for domestic use as an adhesive, because a self-hardening adhesive is prepared by simply adding water to the dry material. The batch of adhesive solution prepared from the dry mixture may be as small or as large as desired, and it always contains the correct proportion of hardening agent.

Since the hardening agent is already contained in a mixture embodying the invention, it is not necessary for the user to weigh out successive portions of hardening agent as successive portions of adhesive are removed from the container. Each batch of adhesive solution can be made up as it is needed, by simply removing the desired amount of the dry mixture from the container and dissolving it in water.

A stable dry composition embodying the invention, for use as a water paint, can be prepared by incorporating a pigment in the mixture along with the hardenable water-soluble formaldehyde-urea reaction product and the hardening agent. Upon addition of water to such a mixture, a self-hardening coating composition is obtained.

In a dry mixture embodying the invention, for use as a water paint, the pigment is preferably dispersed intimately throughout the formaldehyde-urea reaction product. If desired, the pigment and formaldehyde-urea reaction product may be mixed dry; for example, by grinding them together in a ball mill. However, a dispersion of the pigment in the solid formaldehyde-urea reaction product is preferably prepared by first dispersing the pigment in an aqueous solution of the formaldehyde-urea reaction product and then evaporating the resulting dispersion in a suitable apparatus such as a spray-drier or vacuum drum drier. Before the dispersion is evaporated, a non-volatile water-soluble organic solvent such as ethylene glycol may be added to serve as a plasticizer in the composition. A dispersion of the pigment in a solution of the formaldehyde-urea reaction product, suitable for spray-drying or vacuum drum-drying, may be prepared by means of a dispersing apparatus such as a ball mill, roller mill, or colloid mill.

The amount of pigment used in the composition depends upon whether a glossy finish or a flat finish is desired. A glossy finish can be obtained by the use of approximately equal parts by weight of pigment and formaldehyde-urea reaction product, and a flat finish can be obtained by the use of a greater proportion of pigment.

The acid whose ammonium salt is employed as the hardening agent in a dry mixture embodying the invention must be a non-volatile acid which is strong enough so that a 1-per cent aqueous solution of the acid has a pH not greater than about 4. An ammonium salt of a weaker acid cannot be employed successfully, because it would not render the aqueous solution sufficiently acid to make it harden properly after being applied.

The ammonium salt of a volatile acid of similar strength, such as ammonium chloride, ammonium thiocyanate, or ammonium nitrate, cannot be used in a dry mixture with a hardenable water-soluble formaldehyde-urea reaction product, because the formaldehyde-urea reaction product in such a mixture rapidly becomes insoluble.

As used herein, the term "dry mixture" means a compositoin that is dry to the touch. A formaldehyde-urea reaction product that is dry to the touch, such as the product obtained by spray-drying an aqueous solution of a formaldehyde-urea condensation product, may contain 1 or 2 per cent of moisture, and such an amount of moisture does not affect the stability of a mixture embodying the invention. The percentage of moisture in a mixture embodying the invention may be increased without appreciably impairing its stability at ordinary temperatures until the composition is in the form of a gummy mass. However, such a gummy mass is not salable in commercial practice, because it is extremely difficult to dissolve in water. A dry mixture embodying the invention is preferably in granular or powdered form, so that it will dissolve rapidly upon the addition of water.

In the preparation of a dry mixture embodying the invention, for use as an adhesive, crystals of the ammonium salt may simply be mixed with the granular or powdered formaldehyde-urea reaction product. In the preparation of a dry mixture for use as a water paint, an intimate dispersion of the pigment in the formaldehyde-urea reaction product may first be prepared in the form of powder or granules and then mixed with the crystals of the ammonium salt. Preferably, the composition is not ground in a ball mill or other pulverizing apparatus after the ammonium salt has been added to the formaldehyde-urea reaction product.

An aqueous solution prepared by adding water to a dry mixture embodying the invention is not strongly acid at first, but gradually becomes more and more acid. The ammonium salt of the non-volatile acid gradually "extracts" formaldehyde from the formaldehyde-urea reaction product, and the reaction of such formaldehyde with the ammonium salt produces the hexamethylenetetramine salt of the same acid. This hexamethylenetetramine salt is much more acid than the original ammonium salt. Since the composition becomes more and more acid by conversion of the ammonium salt into a hexamethylenetetramine salt, the hardening of the formaldehyde-urea reaction product accelerates after the composition has been applied, and causes the adhesive bond or surface coating to become insoluble after a relatively short period of time.

The proportion of the ammonium salt in a dry mixture embodying the invention is simply the proportion that will cause the formaldehyde-urea reaction product to harden with the desired rapidity after water has been added. A water-soluble formaldehyde-urea reaction product for use in a composition embodying the invention is most readily obtained by reacting formaldehyde and urea in an aqueous solution. If the reaction is carried too far, the formaldehyde-urea reaction product will precipitate upon dilution of the resulting solution. In the preparation of a dry mixture for use as a water paint, a formaldehyde-urea reaction product should be employed that will not precipitate when sufficient water is added to the dry mixture to produce a composition of a consistency suited to the method by which it is to be applied, such as brushing or spraying.

A water-soluble formaldehyde-urea reaction product for use in a composition embodying the invention may be prepared as follows: 1 mol of urea is added to a 37 per cent aqueous solution containing 2 mols of formaldehyde that has been brought to pH 4.5–5.5 by means of sodium hydroxide. The solution is then gently refluxed long enough (about 1 hour) to carry the reaction to a suitable stage, after which the solution is neutralized. It may then be evaporated by spray-drying or vacuum drum-drying, to produce a solid product.

The formaldehyde-urea reaction product should be prepared in a substantially neutral condition; for example, by neutralization of the initial aqueous solution of the reaction product prior to evaporation, as in the foregoing procedure. A dry formaldehyde-urea reaction product that is markedly acid is not desirable, because such a reaction product is unstable even when no hardening agent is added to it.

In the following examples, ammonium dihydrogen phosphate, diammonium hydrogen phosphate, or ammonium oxalate containing 2 mols of water of crystallization for each mol of ammonium oxalate may be used instead of ammonium sulfate.

Example 1

A spray-dried formaldehyde-urea reaction product is prepared in accordance with the foregoing procedure without the addition of any pigment. 1 part of dry ammonium sulfate is mixed with 100 parts of the spray-dried formaldehyde-urea reaction product. Fillers or extenders may be added if desired. The resulting dry mixture forms a self-hardening adhesive or impregnating composition upon addition of sufficient water to produce a solution of the desired consistency. Assembled parts that have been glued with this adhesive may be held at ordinary temperatures while the adhesive hardens. Plywood panels and similar articles may be placed under pressure during the hardening of the adhesive. If desired, a heated press may be used to secure quick hardening of the panels, or the panels may simply be clamped together and stored at an elevated temperature to hasten the hardening.

Example 2

An aqueous solution containing 100 parts of a formaldehyde-urea reaction product is prepared in accordance with the foregoing procedure, and a roller mill is used to disperse 100 parts of titanium oxide pigment in the solution. After the addition of 1 part of ethylene glycol as a plasticizer, the resulting dispersion is evaporated in a spray-drier, and 1 part of dry ammonium sulfate is mixed with 200 parts of the spray-dried product. A water paint can be prepared by adding water to the resulting mixture until the desired consistency is attained. The resulting paint dries rapidly, and is dry to the touch about 1 hour after it is applied. A few days after the application of the coating, it is insoluble or washable. The coating does not dust off, and resembles an oil paint.

Various embodiments of the invention may be devised to meet various requirements.

Having described my invention, I claim:

1. A stable dry mixture of an adhesive and a hardening agent therefor, comprising a hardenable water-soluble formaldehyde-urea reaction product in admixture with an ammonium salt of an acid whose volatility is not substantially greater than that of sulfuric acid, and which is strong enough so that its one-per cent aqueous solution has a pH not greater than about 4, said mixture, upon addition of water, forming a self-hardening adhesive solution.

2. A stable dry mixture of an adhesive and a hardening agent therefor, comprising a hardenable water-soluble formaldehye-urea reaction product in admixture with ammonium sulphate, said mixture, upon addition of water, forming a self-hardening adhesive solution.

3. A stable dry mixture for use as a water paint, comprising a pigment and a hardenable water-soluble formaldehyde-urea reaction product in admixture with a hardening agent for said reaction product, consisting of an ammonium salt of an acid whose volatility is not substantially greater than that of sulfuric acid, and which is strong enough so that its one-per cent aqueous solution has a pH not greater than about 4, said mixture, upon addition of water, forming a self-hardening coating composition.

4. A stable dry mixture for use as a water paint, comprising a dispersion of a pigment in a solid, hardenable water-soluble formaldehyde-urea reaction product, in admixture with a hardening agent for said reaction product consisting of an ammonium salt of an acid whose volatility is not substantially greater than that of sulfuric acid, and which is strong enough so that its one-per cent aqueous solution has a pH not greater than about 4, said mixture, upon addition of water, forming a self-hardening coating composition comprising a dispersion of the pigment in a solution of the formaldehyde-urea reaction product.

5. A stable dry mixture for use as a water paint, comprising a dispersion of a pigment in a solid, hardenable water-soluble formaldehyde-urea reaction product, in admixture with a hardening agent for said reaction product consisting of ammonium sulphate, said mixture, upon addition of water, forming a self-hardening coating composition comprising a dispersion of the pigment in a solution of the formaldehyde-urea reaction product.

WILLIAM C. DEARING.